(12) United States Patent
Chiranthan et al.

(10) Patent No.: US 11,815,267 B2
(45) Date of Patent: Nov. 14, 2023

(54) COMBUSTOR LINER HAVING COOLING DISPERSING MEMBER FOR LOCALIZED LINER COOLING

(71) Applicant: General Electric Company, Schenectady, NY (US)

(72) Inventors: Ranganatha Narasimha Chiranthan, Bengaluru (IN); Karthikeyan Sampath, Bengaluru (IN); Perumallu Vukanti, Bengaluru (IN); Rimple Rangrej, Bengaluru (IN); Ravindra Shankar Ganiger, Bengaluru (IN); Hiranya Nath, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/809,381

(22) Filed: Jun. 28, 2022

(65) Prior Publication Data
US 2023/0266007 A1    Aug. 24, 2023

(30) Foreign Application Priority Data

Feb. 24, 2022   (IN) .............................. 202211009947

(51) Int. Cl.
*F23R 3/16*   (2006.01)
*F23R 3/06*   (2006.01)

(52) U.S. Cl.
CPC .................. *F23R 3/16* (2013.01); *F23R 3/06* (2013.01); *F23R 2900/00001* (2013.01); *F23R 2900/03044* (2013.01); *F23R 2900/03045* (2013.01)

(58) Field of Classification Search
CPC .... F23R 3/002; F23R 3/06; F23R 3/16; F23R 2900/00001; F23R 2900/03044; F23R 2900/03041; F23R 2900/03045
See application file for complete search history.

(56) References Cited

U.S. PATENT DOCUMENTS

| | | |
|---|---|---|
| 5,216,886 A | 6/1993 | Ewing |
| 5,605,046 A | 2/1997 | Liang |
| 7,380,380 B2 | 6/2008 | Soyris |

(Continued)

FOREIGN PATENT DOCUMENTS

| | | |
|---|---|---|
| DE | 1211441 B | 2/1966 |
| WO | 2006/045758 A1 | 5/2006 |

*Primary Examiner* — Jason H Duger
(74) *Attorney, Agent, or Firm* — Venable LLP; Edward A. Kmett; Michele V. Frank

(57) ABSTRACT

A combustor liner for a gas turbine has a cold side liner segment, and a hot side liner segment, with a baffle cavity between the cold side liner segment and the hot side liner segment. At least one cooling airflow dispersing member is arranged within the baffle cavity. The at least one cooling airflow dispersing member includes a main cavity portion, and at least one peripheral cavity portion surrounding the main cavity portion. The main cavity portion includes a main cavity inlet side having a cooling airflow opening, a main cavity outlet side having plurality of hot side cooling airflow openings, and at least one peripheral cavity outlet flow passage providing fluid communication between the main cavity portion and the at least one peripheral cavity portion. The at least one peripheral cavity portion includes a peripheral cavity outlet side having a plurality of hot side cooling airflow openings.

19 Claims, 10 Drawing Sheets

(56) References Cited

U.S. PATENT DOCUMENTS

| | | | |
|---|---|---|---|
| 9,335,049 B2 | 5/2016 | Cunha et al. | |
| 10,260,749 B2 | 4/2019 | Harding | |
| 10,473,331 B2 | 11/2019 | Quach et al. | |
| 10,551,067 B2 | 2/2020 | Okita et al. | |
| 10,830,434 B2 | 11/2020 | Quach et al. | |
| 10,941,937 B2 | 3/2021 | Kramer et al. | |
| 2009/0277180 A1* | 11/2009 | Lam | F23R 3/002 60/752 |
| 2015/0159870 A1* | 6/2015 | Huber | F23R 3/002 60/725 |
| 2018/0252413 A1* | 9/2018 | Clemen | F23R 3/002 |
| 2018/0266686 A1* | 9/2018 | Zelesky | F02C 3/04 |

* cited by examiner

COMBUSTOR LINER HAVING COOLING DISPERSING MEMBER FOR LOCALIZED LINER COOLING

CROSS REFERENCE TO RELATED APPLICATIONS

The present application claims the benefit of Indian Patent Application No. 202211009947, filed on Feb. 24, 2022, which is hereby incorporated by reference herein in its entirety.

TECHNICAL FIELD

The present disclosure relates to a combustor liner having a cooling dispersing member for localized cooling of the combustor liner.

BACKGROUND

Some gas turbine engines include a multi-layer combustor liner that includes an outer shell and an inner liner with a cooling airflow space between the outer shell and the inner liner. The cooling airflow space generally extends about the entirety of the inner liner. Cooling holes are provided in the outer shell to allow cooling air to flow into the cooling airflow space to provide impingement cooling against a cold side of the inner liner. Cooling holes may also be included through the inner liner to allow some of the cooling air to flow from the cooling airflow passage through the inner liner to provide surface cooling of a hot side of the inner liner. During operation of the engine, a swirler assembly injects a fuel-air mixture into a combustion chamber, where it is ignited and burned to generate combustion products. Hot spots may be created on the inner liner nearest the swirler assembly due to the combustion.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
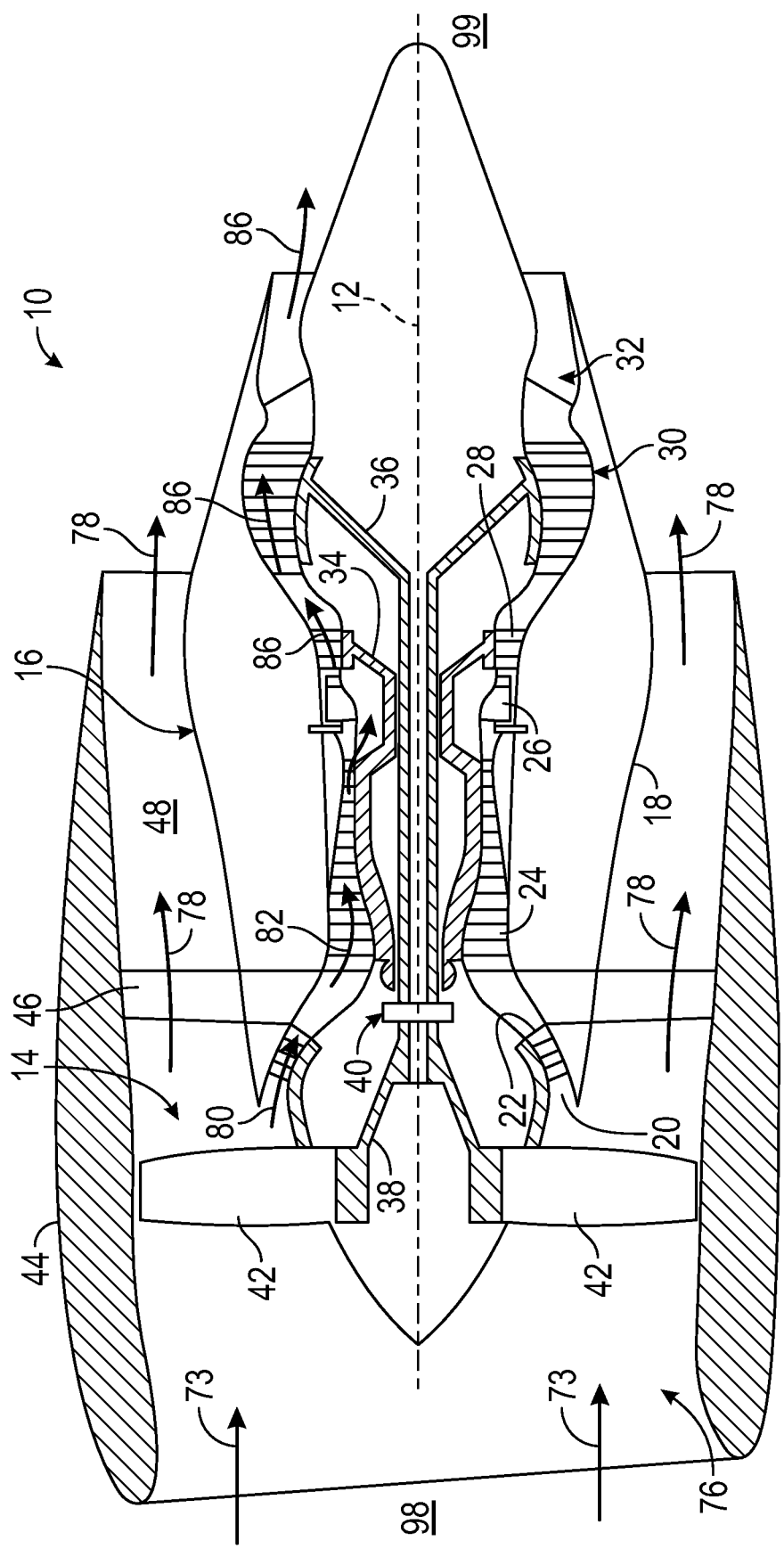
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some gas turbine engines include a multi-layer combustor liner that includes an outer shell and an inner liner with a cooling airflow space between the outer shell and the inner liner. Cooling holes are provided in the shell to allow cooling air to flow into the cooling airflow space to provide impingement cooling against a cold side of the inner liner. Cooling holes may also be included through the inner liner to allow some of the cooling air to flow from the cooling airflow passage through the inner liner to provide surface cooling of a hot side of the inner liner. During operation of the engine, a swirler assembly injects a fuel-air mixture into a combustion chamber, where it is ignited and burned to generate combustion products. The cooling airflow within the cooling airflow space provides some cooling of the inner liner via impingement of the cooling airflow against the cold side of the inner liner. Portions of the inner liner nearest the ignited fuel-air mixture are subject to intense heat, which can result in hot spots in the inner liner. The intense heat in the hot spots, over time, degrades the inner liner such that the inner liner may experience cracking or may even have a burn-through hole in the inner liner. While the cooling air flowing within the cooling airflow passage may provide some impingement cooling to the inner liner, the hot spots are nonetheless still subject to higher temperatures than other portions of the inner liner.

The present disclosure provides a technique for localized cooling of the hot spots of the inner liner. According to the present disclosure, at least one cooling airflow member is provided within the cooling airflow space (i.e., a baffle cavity) between the shell and the inner liner at anticipated hot spot locations of the inner liner. The cooling airflow member includes a main cavity arranged at the highest temperature region of the hot spot of the inner liner, and the main cavity directs a cooling airflow to impinge on the cold side of the inner liner to provide localized cooling at the hot spot location. The main cavity is surrounded by peripheral cavities, where some of the cooling airflow from the main cavity flows into an adjacent surrounding peripheral cavity to provide localized impingement cooling to an area of the inner liner surrounding the highest temperature region. Additional peripheral cavities may also be included, with cooling airflow being provided to the additional peripheral cavities from the inner-most peripheral cavity. Each of the main cavity and the peripheral cavities may also include cooling holes through the inner liner to provide surface cooling on the hot side of the inner liner. Thus, a more targeted cooling can be provided at each hot spot of the inner liner so as to better reduce the temperature at the hot spots and, thereby, improve the durability of the inner liner.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. As shown in FIG. 1, engine 10 has an axial centerline axis 12 that extends therethrough from an upstream end 98 to a downstream end 99 for reference purposes. In general, the engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, a compressor section (22/24) having a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
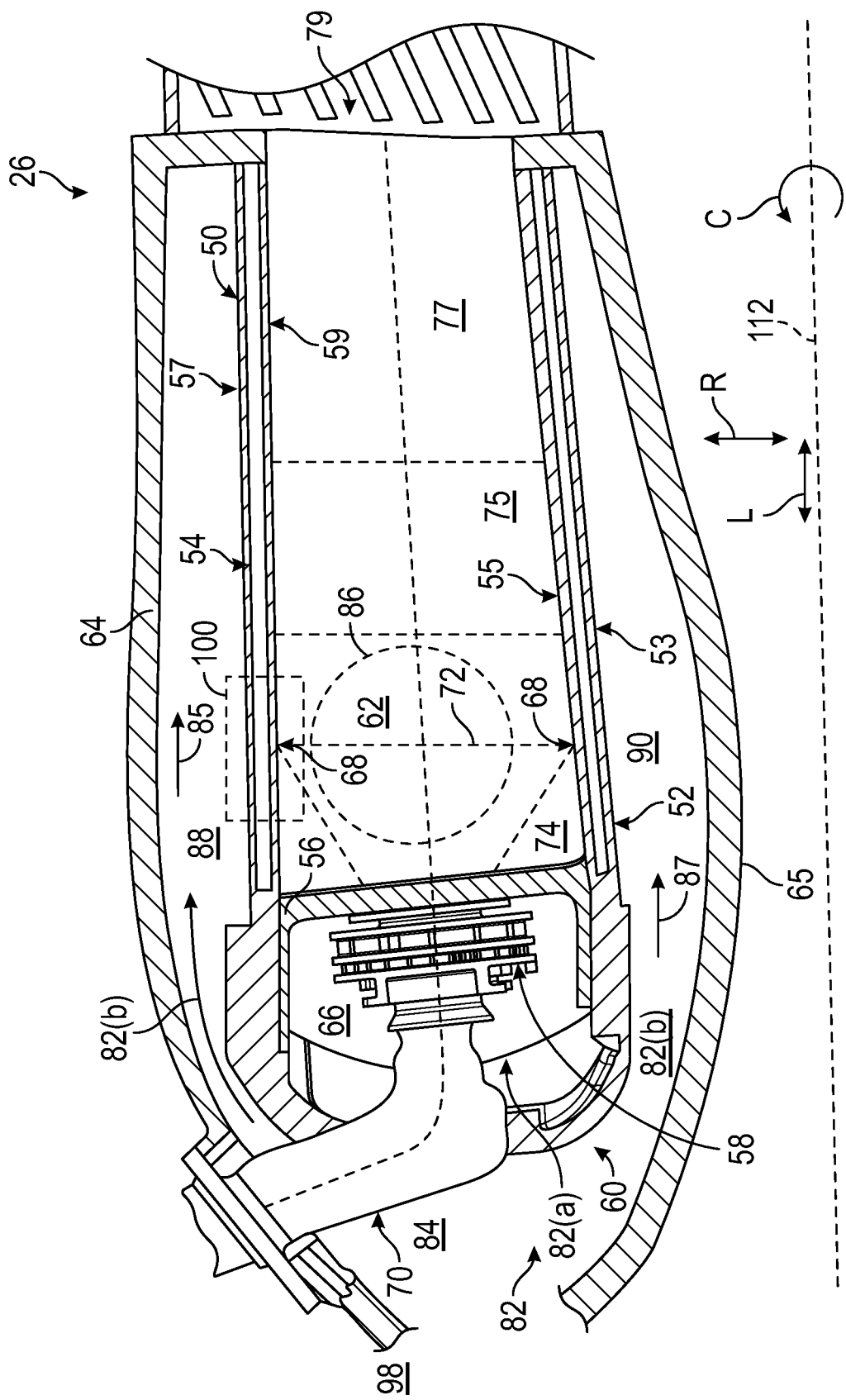
FIG. 2 is a partial cross-sectional side view of an exemplary combustor, according to an aspect of the present disclosure.

FIG. 2 is a cross-sectional side view of an exemplary combustor 26 of the core engine 16 as shown in FIG. 1. As shown in FIG. 2, the combustor 26 may generally include a combustor liner 50 having an inner liner 52 and an outer liner 54, and a dome assembly 56, together defining a combustion chamber 62. Both the inner liner 52 and the outer liner 54 may extend circumferentially about a combustor centerline axis 112, which may correspond to the engine axial centerline axis 12. The inner liner 52 and the outer liner 54 are connected to a cowl 60, and a pressure plenum 66 is defined between the cowl 60, the inner liner 52, the outer liner 54, and the dome assembly 56. The combustor 26 also includes a mixer assembly 58 that is connected to a fuel nozzle assembly 70. While FIG. 2 depicts a single mixer assembly 58 and a single fuel nozzle assembly 70, a plurality of mixer assemblies 58 and respective fuel nozzle assemblies 70 may be included in the combustor 26, where each respective mixer assembly 58 and fuel nozzle assembly 70 are circumferentially spaced about the combustor centerline axis 112.

As shown in FIG. 2, the inner liner 52 is encased within an inner casing 65 and the outer liner 54 is encased within an outer casing 64. An outer flow passage 88 is defined between the outer liner 54 and the outer casing 64, and an inner flow passage 90 is defined between inner liner 52 and the inner casing 65. Both the outer casing 64 and the inner casing 65 may extend circumferentially about the combustor centerline axis 112. A cold surface side 53 of the inner liner 52 is adjacent the inner flow passage 90, and a hot surface side 55 of the inner liner 52 is adjacent to the combustion chamber 62. Similarly, a cold surface side 57 of the outer liner 54 is adjacent to the outer flow passage 88, and a hot surface side 59 of the outer liner 54 is adjacent to the combustion chamber 62. The inner liner 52 and the outer liner 54 may extend from the dome assembly 56 to a turbine nozzle 79 at an entry to the HP turbine 28 (FIG. 1), thus at least partially defining a hot gas path between the combustor liner 50 and the HP turbine 28. The combustion chamber 62 may more specifically define a primary combustion zone 74 at which an initial chemical reaction of a fuel-oxidizer mixture 72 occurs to generate combustion gases 86, and/or where recirculation of the combustion gases 86 may occur before the combustion gases 86 flow further downstream to a dilution zone 75. At the dilution zone 75, the combustion gases 86 mix with dilution air before flowing to a secondary combustion zone 77 and into a turbine nozzle 79 at the entry to the HP turbine 28 and the LP turbine 30. As will be described in more detail below, both the outer liner 54 and the inner liner 52 include cooling airflow openings that provide a flow of cooling air from the outer flow passage 88, and from the inner flow passage 90 through the outer liner 54 and the inner liner 52, to provide cooling to the outer liner 54 and to the inner liner 52. More particularly, each of the outer liner 54 and the inner liner 52 may have hot spots 68 in which the temperature of the liner is the most intense, and, as will be described below, the present disclosure provides a technique to have greater localized cooling at the hot spots 68 of the outer liner 54 and the inner liner 52.

During operation of the engine 10, as shown in FIGS. 1 and 2 collectively, a volume of air, as indicated schematically by arrows 73 (FIG. 1), enters the engine 10 from the upstream end 98 through an associated nacelle inlet 76 of the nacelle 44 and/or the fan assembly 14. As the air 73 passes across the fan blades 42, a portion of the air 73 is directed or routed into the bypass airflow passage 48 as a bypass airflow 78, while another portion of the air 73 is directed or routed into the LP compressor 22 as a compressor inlet air 80. The compressor inlet air 80 is progressively compressed as it flows through the LP compressor 22 and the HP compressor 24 towards the combustor 26. As shown in FIG. 2, compressed air 82 flows into and pressurizes a diffuser cavity 84. A first portion of the compressed air 82, as indicated schematically by arrows 82(a), flows from the diffuser cavity 84 into the pressure plenum 66, where it is mixed by mixer assembly 58 with fuel provided by a fuel nozzle assembly 70. A fuel-oxidizer mixture 72 is then ejected into the combustion chamber 62 by the mixer assembly 58. The fuel-oxidizer mixture 72 is ignited and burned to generate the combustion gases 86 within the primary combustion zone 74 of the combustion chamber 62. Typically, the LP compressor 22 and the HP compressor 24 provide more compressed air 82 to the diffuser cavity 84 than is needed for combustion. Therefore, a second portion of the compressed air 82, as indicated schematically by arrows 82(b), may be used for various purposes other than combustion. For example, as shown in FIG. 2, compressed air 82(b) may be routed into the outer flow passage 88 and generally flows downstream in a flow direction 85 within the outer flow passage 88. Similarly, a portion of the compressed air 82(b) may be routed into the inner flow passage 90 and generally flows downstream in a flow direction 87 within the inner flow passage 90. As will be described in more detail below, a portion of the compressed air 82(b) may be utilized for providing cooling to the outer liner 54 and to the inner liner 52. In addition, a portion of the compressed air 82(b) may be routed through dilution openings (not shown) in the outer liner 54 and the inner liner 52 into the dilution zone 75 of combustion chamber 62 to provide quenching of the combustion gases 86 in dilution zone 75. In addition, or in the alternative, at least a portion of the compressed air 82(b) may be routed out of the diffuser cavity 84 for other purposes, such as to provide cooling air to at least one of the HP turbine 28 or the LP turbine 30.

Referring back to FIGS. 1 and 2 collectively, the combustion gases 86 generated in the combustion chamber 62 flow through the turbine nozzle 79 and into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at the downstream end 99.

Figure 3:
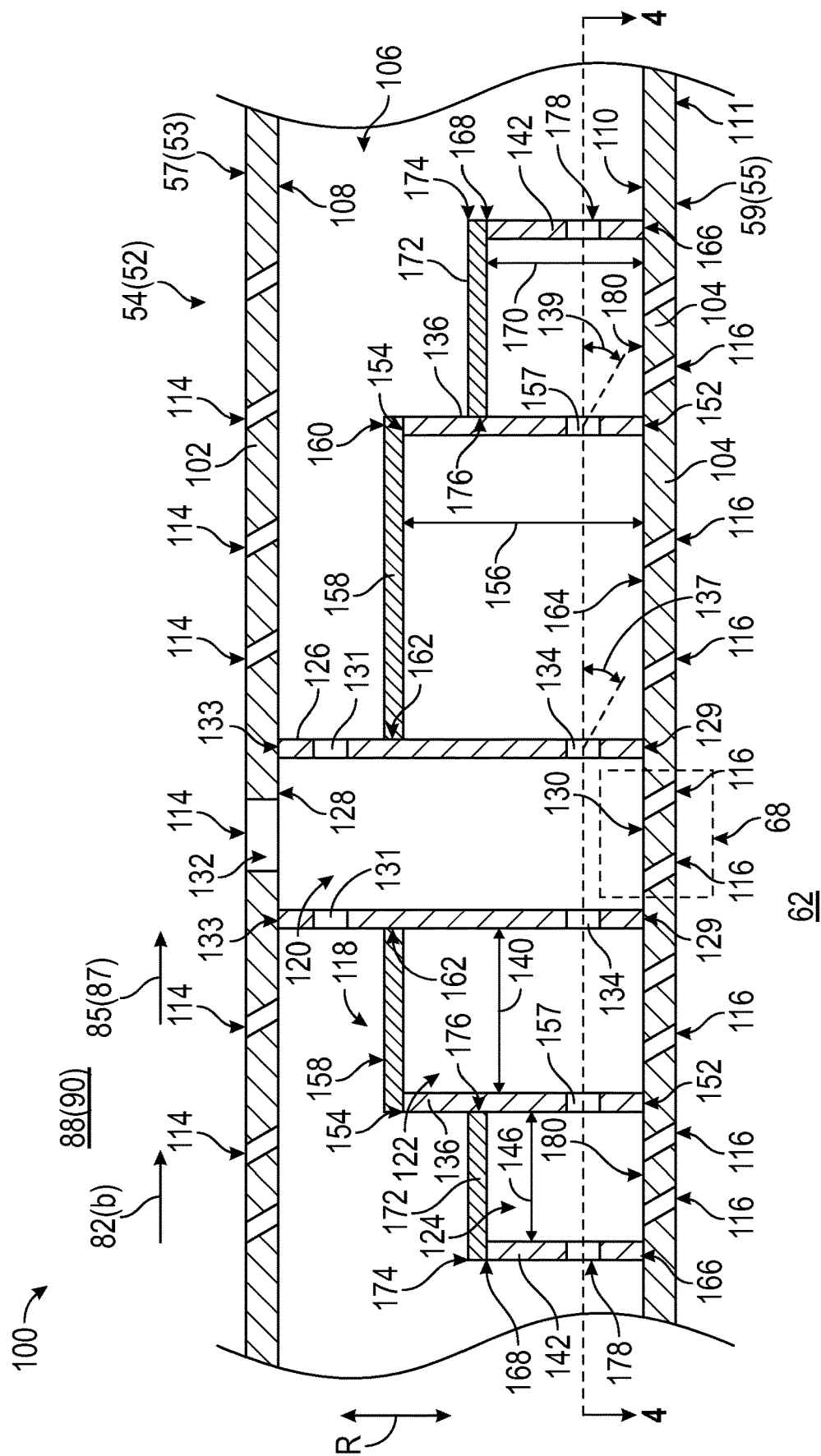
FIG. 3 is a schematic partial cross-sectional view of a portion of the outer liner, taken at detail view 100 in FIG. 2, according to an aspect of the present disclosure.

FIG. 3 is a schematic partial cross-sectional view of a portion of the outer liner 54, taken at detail view 100 in FIG. 2. The arrangement of FIG. 3 is also applicable to the inner liner 52 and, therefore, references to the various inner liner elements may be included in the drawings in parentheses. The following description, however, will be made with regard to the elements of the outer liner 54 for brevity. As shown in FIG. 3, the outer liner 54 is a multi-layer liner that includes a cold side liner segment 102 and a hot side liner segment 104 arranged radially inward of the cold side liner segment 102. The cold side liner segment 102 is arranged adjacent to the outer flow passage 88 and the hot side liner segment 104 is arranged adjacent to the combustion chamber 62. A baffle cavity 106 is defined between a first side 108 of the cold side liner segment 102 and a first side 110 of the hot side liner segment 104. The cold side liner segment 102 includes a plurality of cold side cooling airflow openings 114 therethrough to allow some of the compressed air 82(b) in the outer flow passage 88 to flow into the baffle cavity 106, and the hot side liner segment 104 includes a plurality of hot side cooling airflow openings 116 extending therethrough from the first side 110 of the hot side liner segment 104 to a hot surface side 111 of the hot side liner segment 104 to allow the compressed air 82(b) to flow from the baffle cavity 106 into the combustion chamber 62.

The outer liner 54 further includes at least one cooling airflow dispersing member 118 arranged within the baffle cavity 106. While FIG. 3 depicts one cooling airflow dispersing member 118, the outer liner 54 and the inner liner 52 may include a plurality of cooling airflow dispersing members 118. For example, a plurality of the cooling airflow dispersing members 118 may be circumferentially spaced about the outer liner 54, with respective ones of the cooling airflow dispersing members 118 being arranged at respective hot spots 68 in the combustor liner 50.

Figure 4:
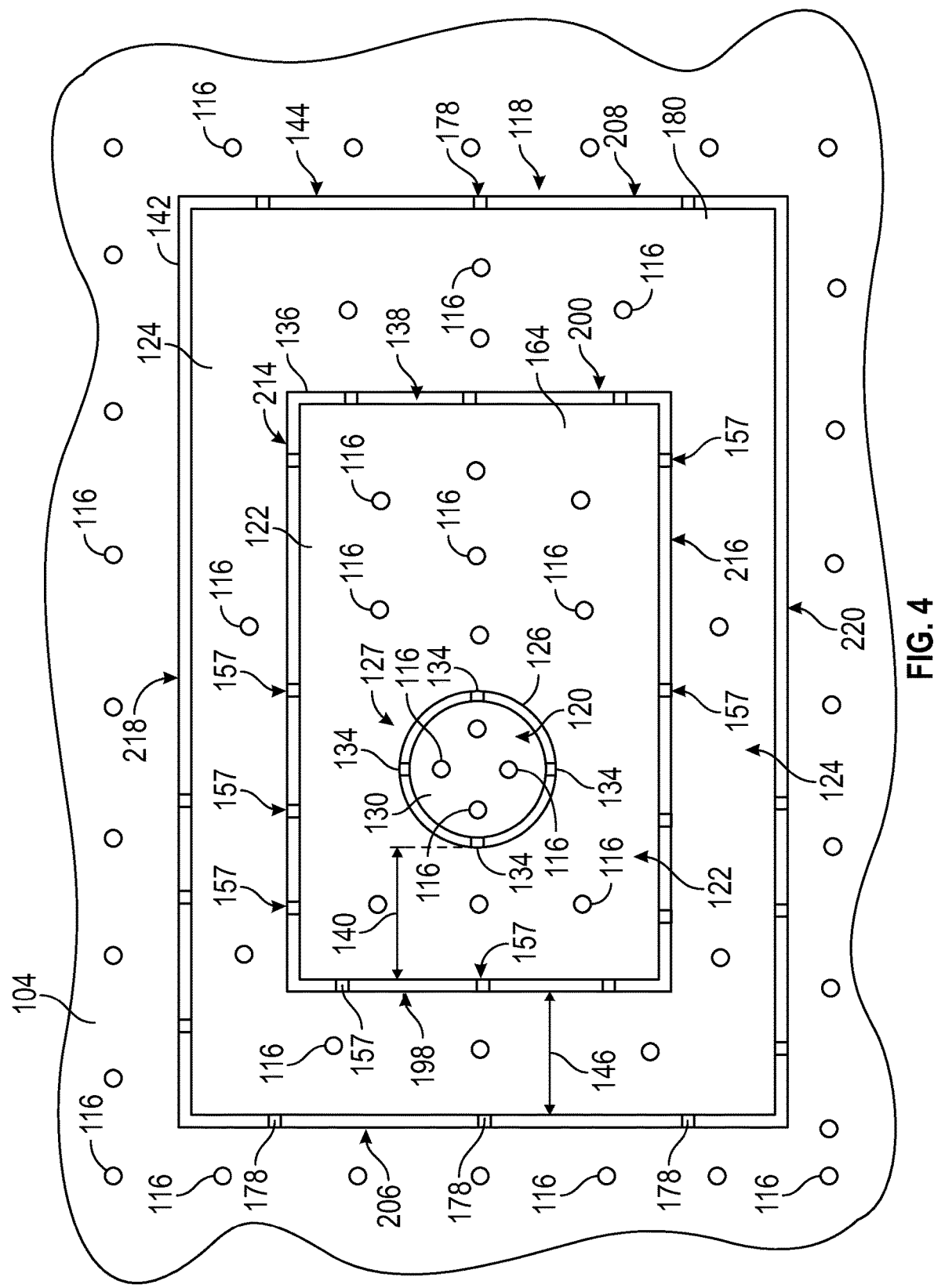
FIG. 4 is a schematic partial cross-sectional view of a cooling airflow dispersing member 118 taken at plane 4-4 of FIG. 3, according to an aspect of the present disclosure.

FIG. 4 is a schematic partial cross-sectional view of a cooling airflow dispersing member 118 taken at plane 4-4 of FIG. 3, according to an aspect of the present disclosure. Referring to FIGS. 3 and 4 collectively, the cooling airflow dispersing member 118 is seen to include a main cavity portion 120, a first peripheral cavity portion 122 surrounding the main cavity portion 120, and a second peripheral cavity portion 124 surrounding the first peripheral cavity portion 122. While FIGS. 3 and 4 depict two peripheral cavity portions 122/124 surrounding the main cavity portion 120, the present disclosure is not limited to two peripheral cavity portions and additional peripheral cavity portions may be included in the cooling airflow dispersing member 118. In FIG. 3, the main cavity portion 120 is shown as extending from the first side 108 of the cold side liner segment 102 to the first side 110 of the hot side liner segment 104. The main cavity portion 120 is defined by a main cavity wall 126 that, as shown in FIG. 3, extends from the first side 108 of the cold side liner segment 102 to the first side 110 of the hot side liner segment 104. In some aspects, however, a leakage gap, or a plurality of leakage openings (not shown) may be provided between a hot side end 129 of the main cavity wall 126 and the first side 110 of the hot side liner segment 104, and/or may be provided between a cold side end 133 of the main cavity wall 126 and the first side 108 of the cold side liner segment 102. Thus, the main cavity wall 126 may be connected to the cold side liner segment 102 and/or to the hot side liner segment 104. In FIG. 4, the main cavity wall 126 is shown as being a generally cylindrical wall that defines a main cavity wall perimeter 127. Of course, the main cavity wall 126 is not limited to being a cylindrical wall and other shapes may be utilized instead to define the main cavity portion 120. The main cavity portion 120 is also defined by a main cavity inlet side 128, which may be a portion of the cold side liner segment 102, and a main cavity outlet side 130, which may be a portion of the hot side liner segment 104. The main cavity wall 126 may be bonded to the cold side liner segment 102 and to the hot side liner segment 104 via, for example, being welded or brazed. The main cavity inlet side 128 includes at least one of the plurality of cold side cooling airflow openings 114 that provide a flow of the compressed air 82(b) from the outer flow passage 88 to the main cavity portion 120. For example, the main cavity inlet side 128 may include a main cavity inlet opening 132 as one of the plurality of cold side cooling airflow openings 114, where the main cavity inlet opening 132 is larger in size than the cold side cooling airflow openings 114. In addition, the main cavity wall 126 may include a plurality of main cavity leakage openings 131 that provide a leakage flow of cooling air from the main cavity portion 120 to the buffer cavity 106. The main cavity outlet side 130, while providing for impingement cooling to the hot side liner segment 104, may also include at least one of the hot side cooling airflow openings 116. As shown in FIG. 4, the main cavity outlet side 130 may include four of the hot side cooling airflow openings 116. Of course, the main cavity outlet side 130 is not limited to four of the hot side cooling airflow openings 116 and more or fewer of the hot side cooling airflow openings 116 may be included instead. In addition, the main cavity outlet side 130 may not include any of the hot side cooling airflow openings 116 and instead, only impingement cooling may be provided to the main cavity outlet side 130.

The main cavity portion 120 also includes at least one peripheral cavity outlet flow passage 134 for providing fluid communication between the main cavity portion 120 and the first peripheral cavity portion 122. In the aspect of FIGS. 3 and 4, four peripheral cavity outlet flow passages 134 are shown, and each of the peripheral cavity outlet flow passages 134 are shown as extending through the main cavity wall 126. Each of the peripheral cavity outlet flow passages 134 may be arranged at an angle 137 so as to direct a flow of cooling air through the peripheral cavity outlet flow passage 134 onto the first peripheral cavity outlet side 164 of the first peripheral cavity portion 122.

The first peripheral cavity portion 122 includes a first peripheral cavity wall 136 that, as shown in FIG. 4, defines a first peripheral cavity wall perimeter 138, which is defined by an upstream side 198, a first side 214, a downstream side 200, and a second side 216, that surrounds the main cavity wall perimeter 127 with a first gap 140 therebetween. Similarly, the second peripheral cavity portion 124 includes a second peripheral cavity wall 142 that, as shown in FIG. 4, defines a second peripheral cavity wall perimeter 144, which is defined by an upstream side 206, a first side 218, a downstream side 208, and a second side 220, with a second gap 146 between the first peripheral cavity wall 136 and the second peripheral cavity wall 142. In the FIG. 4 aspect, the main cavity wall 126 is shown as being circular-shaped, and both the first peripheral cavity wall 136 and the second peripheral cavity wall 142 are shown as defining a rectangular shape. However, other shapes may be implemented instead as shown in FIGS. 5 to 8.

Figure 5:
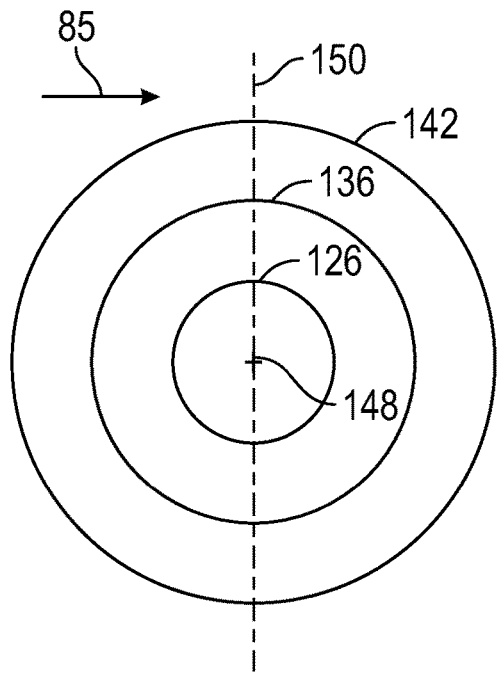
FIG. 5 is a schematic diagram depicting an example of respective shapes for a main cavity wall, a first peripheral cavity wall, and a second peripheral cavity wall, according to an aspect of the present disclosure.
Figure 6:
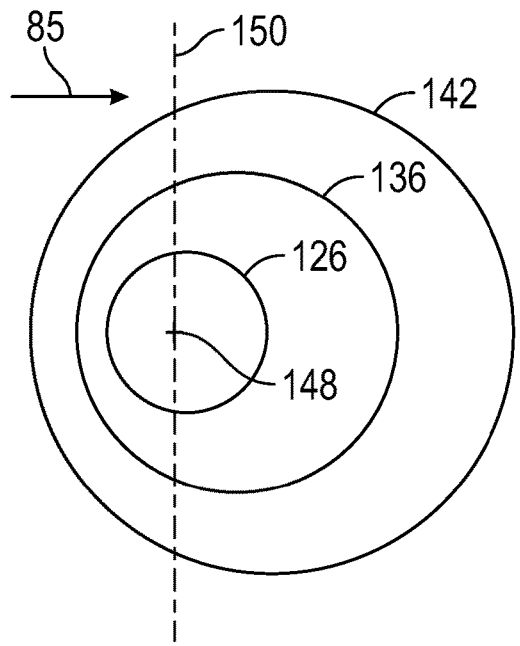
FIG. 6 is a schematic diagram depicting an example of respective shapes for a main cavity wall, a first peripheral cavity wall, and a second peripheral cavity wall, according to another aspect of the present disclosure.
Figure 7:
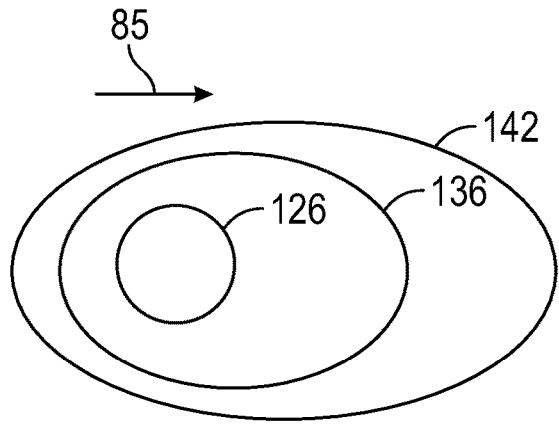
FIG. 7 is a schematic diagram depicting an example of respective shapes for a main cavity wall, a first peripheral cavity wall, and a second peripheral cavity wall, according to another aspect of the present disclosure.
Figure 8:
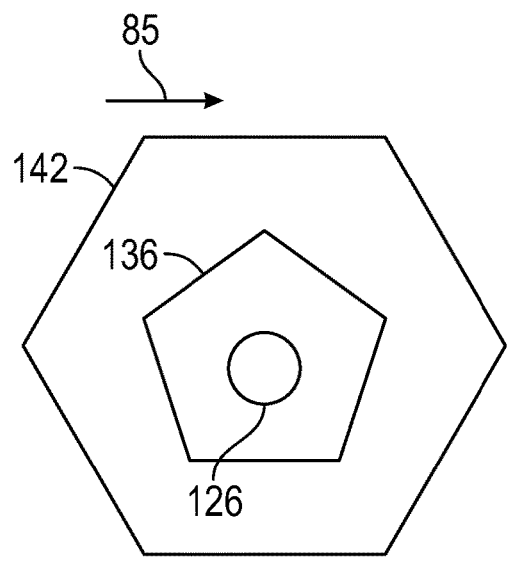
FIG. 8 is a schematic diagram depicting an example of respective shapes for a main cavity wall, a first peripheral cavity wall, and a second peripheral cavity wall, according to another aspect of the present disclosure.

FIGS. 5 to 8 are each schematic diagrams depicting examples of respective shapes that may be implemented for each of the main cavity wall 126, the first peripheral cavity wall 136, and the second peripheral cavity wall 142. In FIGS. 5 and 6, each of the main cavity wall 126, the first peripheral cavity wall 136, and the second peripheral cavity wall 142 are shown to be circular in shape. In FIG. 5, each of the main cavity wall 126, the first peripheral cavity wall 136, and the second peripheral cavity wall 142 is also shown to be arranged concentric to one another with respect to a center 148 of the main cavity wall 126. Each of the main cavity wall 126, the first peripheral cavity wall 136, and the second peripheral cavity wall 142 is symmetric with regard to a centerline 150 through the center 148 that is perpendicular to the flow direction 85. In FIG. 6, however, each of the first peripheral cavity wall 136 and the second peripheral cavity wall 142 is shown as being offset from the centerline 150, such that both the first peripheral cavity wall 136 and the second peripheral cavity wall 142 are asymmetric with respect to the centerline 150. As another example, shown in FIG. 7, the main cavity wall 126 may be circular, while both the first peripheral cavity wall 136 and the second peripheral cavity wall 142 are oval-shaped walls. In FIG. 8, the main cavity wall 126 is again shown as being circular-shaped, while the first peripheral cavity wall 136 is pentagon-shaped, and the second peripheral cavity wall 142 is hexagon-shaped. Thus, the shape of the main cavity wall 126, the first peripheral cavity wall 136, and the second peripheral cavity wall 142 are not limited to any particular shape.

In FIG. 3, the first peripheral cavity wall 136 is seen to extend from partially between the first side 108 of the cold side liner segment 102 and the first side 110 of the hot side liner segment 104, to the first side 110 of the hot side liner segment 104. More particularly, the first peripheral cavity wall 136 includes a first end 152 that is connected with the first side 110 of the hot side liner segment 104, and a second end 154 extending into the baffle cavity 106 a first distance 156 from the first end 152. The first distance 156 may define a height of the first peripheral cavity portion 122.

The first peripheral cavity portion 122 also includes a first peripheral cavity enclosure wall 158 that extends from the main cavity wall 126 to the second end 154 of the first peripheral cavity wall 136. The first peripheral cavity enclosure wall 158 further extends about the main cavity wall perimeter 127 to the first peripheral cavity wall perimeter 138. That is, in the exemplary aspects of FIGS. 3 and 4, the first peripheral cavity enclosure wall 158 may be a rectangular-shaped sheet in which an outer perimeter end 160 is connected to the second end 154 of the first peripheral cavity wall 136. A main cavity opening 162, which, in the aspects of FIGS. 3 and 4, may be a circular hole, is included in the first peripheral cavity enclosure wall 158 and is connected to the main cavity wall 126. In the FIG. 3 aspect, the first peripheral cavity enclosure wall 158 is shown to be arranged generally parallel to both the cold side liner segment 102 and to the hot side liner segment 104. Thus, the first peripheral cavity enclosure wall 158 encloses the first peripheral cavity portion 122 so as to define the first peripheral cavity portion 122 between the main cavity wall 126, the first peripheral cavity enclosure wall 158, the first peripheral cavity wall 136, and the hot side liner segment 104.

The first peripheral cavity wall 136 includes a plurality of first peripheral cavity wall outlet openings 157 that provide fluid communication between the first peripheral cavity portion 122 and the second peripheral cavity portion 124. As will be described in more detail below, cooling air 82(c) from the first peripheral cavity portion 122 flows through the plurality of first peripheral cavity wall outlet openings 157 into the second peripheral cavity portion 124. Each of the peripheral cavity wall outlet openings 157 may be arranged at an angle 139 so as to direct the cooling air 82(c) flowing through the peripheral cavity wall outlet openings 157 onto a second peripheral cavity outlet side 180 of the second peripheral cavity portion 124. The first peripheral cavity portion 122 also includes the first peripheral cavity outlet side 164 that includes at least one of the plurality of the hot side cooling airflow openings 116 therethrough. The plurality of hot side cooling airflow openings 116 through the first peripheral cavity outlet side provide for a flow 228 (FIG. 11) of the cooling air 82(c) to flow from the first peripheral cavity portion 122 to the hot surface side 59 of the hot side liner segment 104. As shown in FIG. 4, the plurality of hot side cooling airflow openings 116 in the first peripheral cavity portion 122 may be arranged dispersed about the first peripheral cavity outlet side 164, where the dispersed arrangement may be based on a temperature gradient of the hot side liner segment 104 about an area of the first peripheral cavity outlet side 164 so as to provide a cooling airflow to the areas having the highest temperature.

In FIG. 3, the second peripheral cavity wall 142 is seen to extend from partially between the first side 108 of the cold side liner segment 102 and the first side 110 of the hot side liner segment 104, to the first side 110 of the hot side liner segment 104. More particularly, the second peripheral cavity wall 142 includes a third end 166 that is connected with the first side 110 of the hot side liner segment 104 and a fourth end 168 extending into the baffle cavity 106 a second distance 170 from the third end 166, where the second distance 170 is less than the first distance 156. Thus, the second distance 170 may define a height of the second peripheral cavity portion 124.

The second peripheral cavity portion 124 also includes a second peripheral cavity enclosure wall 172 that extends from the first peripheral cavity wall 136 to the fourth end 168 of the second peripheral cavity wall 142. The second peripheral cavity enclosure wall 172 further extends about the first peripheral cavity wall perimeter 138 to the second peripheral cavity wall perimeter 144. That is, in the exemplary aspect of FIGS. 3 and 4, the second peripheral cavity enclosure wall 172 may be a rectangular-shaped sheet in which an outer perimeter end 174 is connected to the fourth end 168 of the second peripheral cavity wall 142. A first peripheral cavity opening 176, which in the aspects of FIGS. 3 and 4 may be a rectangular hole, is included in the second peripheral cavity enclosure wall 172 and is connected to the first peripheral cavity wall 136. In the FIG. 3 aspect, the second peripheral cavity enclosure wall 172 is shown to be arranged generally parallel to both the cold side liner segment 102 and to the hot side liner segment 104. Thus, the second peripheral cavity enclosure wall 172 encloses the second peripheral cavity portion 124 so as to define the second peripheral cavity portion 124 between the first peripheral cavity wall 136, the second peripheral cavity enclosure wall 172, the second peripheral cavity wall 142, and the hot side liner segment 104.

The second peripheral cavity wall 142 may also include a plurality of second peripheral cavity wall outlet openings 178 that provide fluid communication between the second peripheral cavity portion 124 and the baffle cavity 106. The plurality of second peripheral cavity wall outlet openings 178 may, however, be omitted. The second peripheral cavity portion 124 also includes a second peripheral cavity outlet side 180 that includes at least one of the plurality of the hot side cooling airflow openings 116 therethrough. The plurality of hot side cooling airflow openings 116 through the second peripheral cavity outlet side 180 provide for a flow of the cooling air 82(c) to flow from the second peripheral cavity portion 124 to the hot surface side 59 of the hot side liner segment 104. As shown in FIG. 4, the plurality of hot side cooling airflow openings 116 in the second peripheral cavity portion 124 may be arranged dispersed about the second peripheral cavity outlet side 180, where the dispersed arrangement may be based on a temperature gradient of the hot side liner segment 104 about an area of the second peripheral cavity outlet side 180 so as to provide a cooling airflow to areas of highest temperature.

Figure 9:
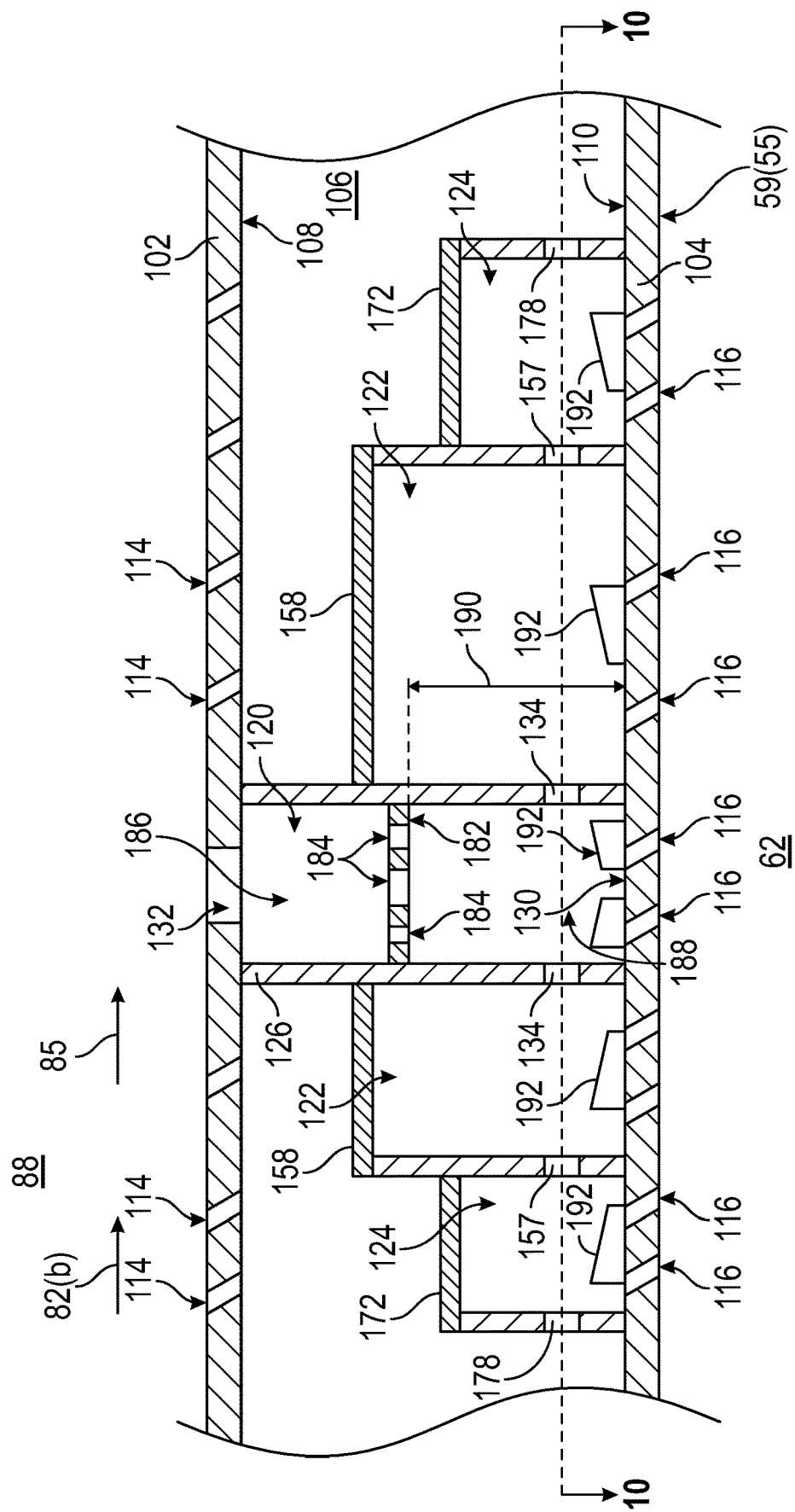
FIG. 9 is a schematic partial cross-sectional view of a portion of the outer liner, taken at detail view 100 in FIG. 2, according to another aspect of the present disclosure.

FIG. 9 is a schematic partial cross-sectional view of a portion of the outer liner 54, taken at detail view 100 in FIG. 2, according to another aspect of the present disclosure. The FIG. 9 aspect is similar to the FIG. 3 aspect, and, therefore, like reference numerals shown in FIG. 9 will not be described further. In the FIG. 9 aspect, unlike the FIG. 3 aspect, the main cavity portion 120, includes a main cavity baffle plate 182 that is arranged within the main cavity portion between the first side 108 of the cold side liner segment 102 and the first side 110 of the hot side liner segment 104. Thus, with the main cavity baffle plate 182, a first main cavity portion 186 is defined between the first side 108 of the cold side liner segment 102 and the main cavity baffle plate 182, and a second main cavity portion 188 is defined between the main cavity baffle plate 182 and the first side 110 of the hot side liner segment 104. The plurality of peripheral cavity outlet flow passages 134 are included within the second main cavity portion 188. The main cavity baffle plate 182 includes at least one main cavity baffle plate opening 184 therethrough. The main cavity baffle plate opening 184 allows for the cooling air 82(c) to flow from the first main cavity portion 186 into the second main cavity portion 188. As will be described in more detail below, the main cavity baffle plate 182 may be arranged within the main cavity portion 120 a distance 190 from the first side 110 of the hot side liner segment 104. The distance 190 to the main cavity baffle plate 182 may be adjusted based on a desired amount of impingement cooling to be provided to the main cavity outlet side 130 in the second main cavity portion 188.

In the FIG. 9 aspect, the main cavity portion 120, the first peripheral cavity portion 122, and the second peripheral cavity portion 124 are each seen to include a plurality of turbulators 192 arranged on the first side 110 of the hot side liner segment 104. The turbulators 192 are generally vanes that extend from the first side 110 of the hot side liner segment 104 into the respective cavity (i.e., into the main cavity portion 120, into the first peripheral cavity portion 122, and into the second peripheral cavity portion 124).

Figure 10:
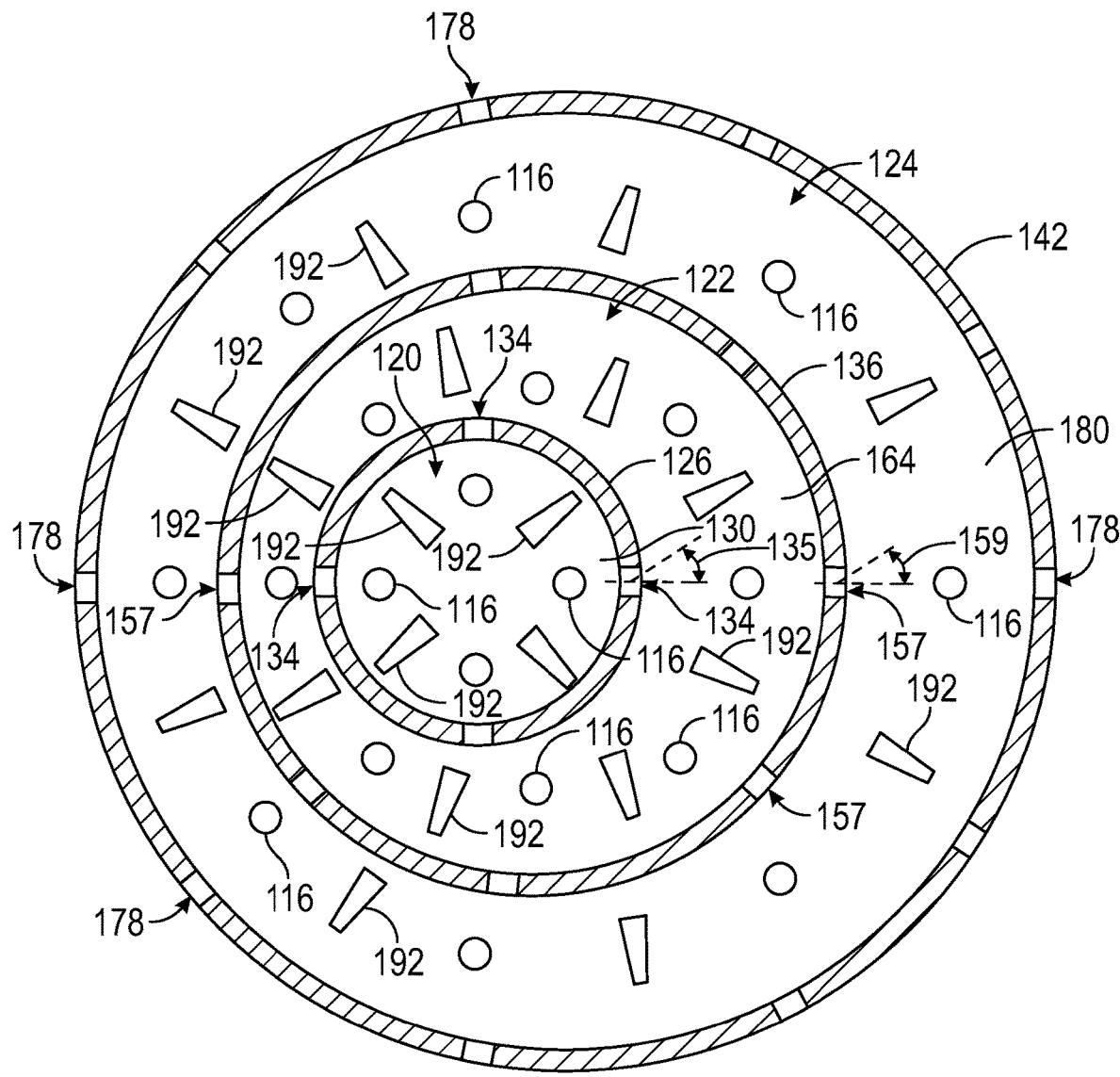
FIG. 10 is a schematic partial cross-sectional view of a cooling airflow dispersing member taken at plane 10-10 of FIG. 9, according to an aspect of the present disclosure.

FIG. 10 is a schematic partial cross-sectional view of a cooling airflow dispersing member 118 taken at plane 10-10 of FIG. 9, according to an aspect of the present disclosure. The FIG. 10 aspect includes an arrangement for the main cavity wall 126, the first peripheral cavity wall 136, and the second peripheral cavity wall 142 that is similar to that shown in FIG. 6. That is, each of the main cavity wall 126, the first peripheral cavity wall 136, and the second peripheral cavity wall 142 are generally circular shaped walls defining circular-shaped cavities. In each cavity portion, the plurality of turbulators 192 are spaced apart in a general circumferential direction with respect to the circular-shaped cavity so as to generate turbulence and to induce a swirl into the flow of air entering the respective cavities.

Figure 11:
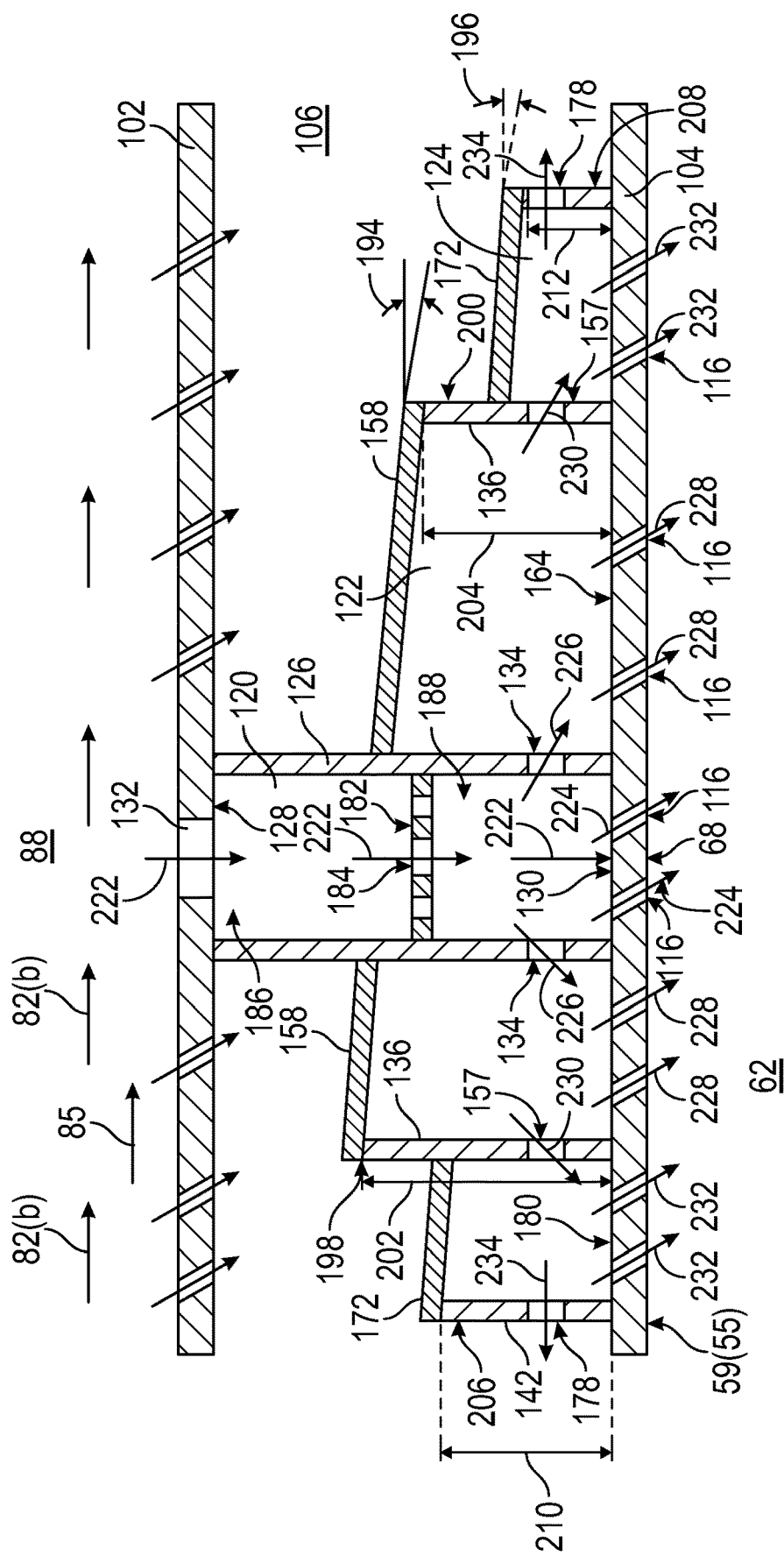
FIG. 11 is a schematic partial cross-sectional view of a portion of the outer liner, taken at detail view 100 in FIG. 2, according to another aspect of the present disclosure.

FIG. 11 is a schematic partial cross-sectional view of a portion of the outer liner 54, taken at detail view 100 in FIG. 2, according to another aspect of the present disclosure. The FIG. 11 aspect is similar to the FIG. 9 aspect and, therefore, like reference numerals will not be described again. In FIG. 11, however, the first peripheral cavity enclosure wall 158 is shown to be arranged at an angle 194 and the second peripheral cavity enclosure wall 172 is shown to be arranged at an angle 196. Thus, an upstream side 198 of the first peripheral cavity wall 136 may have a height 202 and a downstream side 200 of the first peripheral cavity wall 136 may have a height 204 that is less than the height 202. Similarly, an upstream side 206 of the second peripheral cavity wall 142 may have a height 210 and a downstream side 208 of the second peripheral cavity wall 142 may have a height 212 that is less than the height 210. Referring back to FIG. 4, for the first peripheral cavity wall 136, the first side 214 of the first peripheral cavity wall 136 and the second side 216 of the peripheral cavity wall 136 (FIG. 4) transition from the height 202 at the upstream side 198 to the height 204 at the downstream side 200 of the first peripheral cavity wall 136. Similarly, for the second peripheral cavity wall 142, the first side 218 of the second peripheral cavity wall 142 and the second side 220 (FIG. 4) of the second peripheral cavity wall 142 transition from the height 210 at the upstream side 206 to the height 212 at the downstream side 208. Thus, the first peripheral cavity portion 122 may provide for a more compressed flow of air on the downstream side 200 than on the upstream side 198 so as to provide a greater flow velocity on the downstream side 200, and the second peripheral cavity portion 124 may likewise provide for a more compressed flow of air on the downstream side 208 than on the upstream side 206 so as to provide a greater flow velocity on the downstream side 208 than on the upstream side 206.

Referring again to FIG. 11, a liner cooling process of providing localized cooling to the hot side liner segment 104 via the cooling airflow dispersing member 118 will now be described. As was noted above, the compressed air 82(*b*) flows within the outer flow passage 88 in the flow direction 85. The compressed air 82(*b*) is utilized for implementing the cooling process and the compressed air 82(*b*) utilized by the cooling airflow dispersing member 118 will hereafter be referred to as a cooling air 82(*c*). The main cavity inlet opening 132 of the main cavity inlet side 128 is arranged to provide a first flow 222 of the cooling air 82(*c*) into the main cavity portion 120. In the aspect of FIG. 11 that includes the main cavity baffle plate 182, the first flow 222 of the cooling air 82(*c*) enters the first main cavity portion 186 and then flows through the main cavity baffle plate openings 184 into the second main cavity portion 188. The first flow 222 of the cooling air 82(*c*) impinges against the main cavity outlet side 130 of the hot side liner segment 104 within the main cavity portion 120. As was noted above, a hot spot 68 may be present on the hot side liner segment 104, and the impingement of the first flow 222 of the cooling air 82(*c*) provides backside cooling to the hot side liner segment 104 at the hot spot 68. With the presence of the main cavity baffle plate 182, the first flow 222 of the cooling air 82(*c*) that impinges against the main cavity outlet side 130 may oscillate back and forth within the second main cavity portion 188 between the main cavity outlet side 130 and the main cavity baffle plate 182, thereby, providing a longer exposure time for the cooling air 82(*c*) to impinge on the main cavity outlet side 130. In addition, the plurality of the hot side cooling airflow openings 116 of the main cavity outlet side 130 are configured to provide a second flow 224 of cooling air 82(*c*) from the main cavity portion 120 to the hot surface side 59 of the hot side liner segment 104. The second flow 224 of the cooling air 82(*c*) can provide for film cooling of the hot surface side 59 of the hot side liner segment 104.

The peripheral cavity outlet flow passage 134 through the main cavity wall 126 is configured to provide a third flow 226 of the cooling air 82(*c*) from the main cavity portion 120 into the first peripheral cavity portion 122. The third flow 226 of the cooling air 82(*c*) entering the first peripheral cavity portion 122 impinges against the first peripheral cavity outlet side 164 so as to provide backside cooling to the hot side liner segment 104 in the area of the hot side liner segment corresponding to the first peripheral cavity outlet side 164. The peripheral cavity outlet flow passages 134 may be arranged at an angle 135 (FIG. 10), where the angle 135 may have a range from sixty degrees to minus sixty degrees. When the peripheral cavity outlet flow passages 134 are arranged at the angle 135, they may induce a swirled flow of the third flow 226 into the first peripheral cavity 122. In addition, the plurality of hot side cooling airflow openings 116 of the first peripheral cavity outlet side 164 are configured to provide a fourth flow 228 of the cooling air 82(*c*) from the first peripheral cavity portion 122 to the hot surface side 59 of the hot side liner segment 104 so as to provide film cooling of the hot surface side 59 of the hot side liner segment 104. The plurality of first peripheral cavity wall outlet openings 157 are configured to provide a fifth flow 230 of the cooling air 82(*c*) from the first peripheral cavity portion 122 into the second peripheral cavity portion 124. The fifth flow 230 of the cooling air 82(*c*) impinges against the second peripheral cavity outlet side 180 so as to provide backside cooling of the hot side liner segment 104 in the area corresponding to the second peripheral cavity outlet side 180. In addition, the first peripheral cavity wall outlet openings 157 may be arranged at an angle 159 (FIG. 10), where the angle 159 may have a range from sixty degrees to minus sixty degrees. When the first peripheral cavity wall outlet openings 157 are arranged at the angle 159, they may induce a swirled flow of the fifth flow 230 into the second peripheral cavity 124. The plurality of the hot side cooling airflow openings 116 of the second peripheral cavity outlet side 180 are configured to provide a sixth flow 232 of the cooling air 82(*c*) from the second peripheral cavity portion 124 to the hot surface side 59 of the hot side liner segment 104 so as to provide film cooling to the hot surface side 59 of the hot side liner segment 104 corresponding to the second peripheral cavity outlet side 180. The plurality of second peripheral cavity wall outlet openings 178 may provide for a seventh flow 234 of the cooling air 82(*c*) to flow from the second peripheral cavity portion 124 into the baffle cavity 106. However, the second peripheral cavity wall outlet openings 178 may be omitted and, when the second peripheral cavity wall outlet openings 178 are omitted, the cooling air 82(*c*) within the second peripheral cavity portion 124 is provided via the sixth flow 232 of the cooling air 82(*c*).

The various elements of the cooling airflow dispersing member 118 are configured so as to provide a relatively consistent velocity of the airflow through each of the plurality of hot side cooling airflow openings 116 into the combustion chamber 62. More particularly, the parameters of each of the various elements are taken into consideration so as to achieve a relatively consistent velocity between the second flow 224, the fourth flow 228, and the sixth flow 232. Some of the parameters considered are: a size of the main cavity wall perimeter 127, a size of the first peripheral cavity wall perimeter 138 and the first distance 156 (i.e., the height of the first peripheral cavity wall 136), a size of the second peripheral cavity wall perimeter 144 and the second distance 170 (i.e., the height of the second peripheral cavity wall 142), the number and the size of the peripheral cavity outlet flow passages 134, the number and the size of the first peripheral cavity wall outlet openings 157, the number and the size of the hot side cooling airflow openings 116 through the main cavity outlet side 130, the number and size of the hot side cooling airflow openings 116 through the first peripheral cavity outlet side 164, and the number and the size of the hot side cooling airflow openings 116 through the second peripheral cavity outlet side 180.

Figure 12:
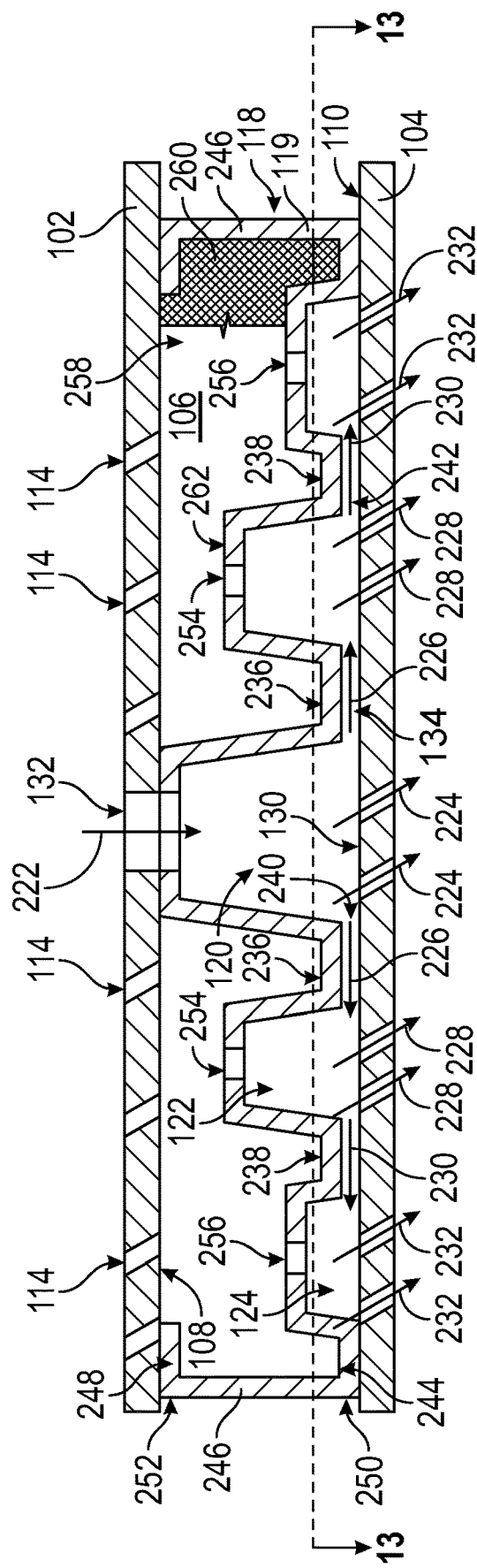
FIG. 12 is a schematic partial cross-sectional view of a portion of the outer liner, taken at detail view 100 in FIG. 2, according to another aspect of the present disclosure.
Figure 13:
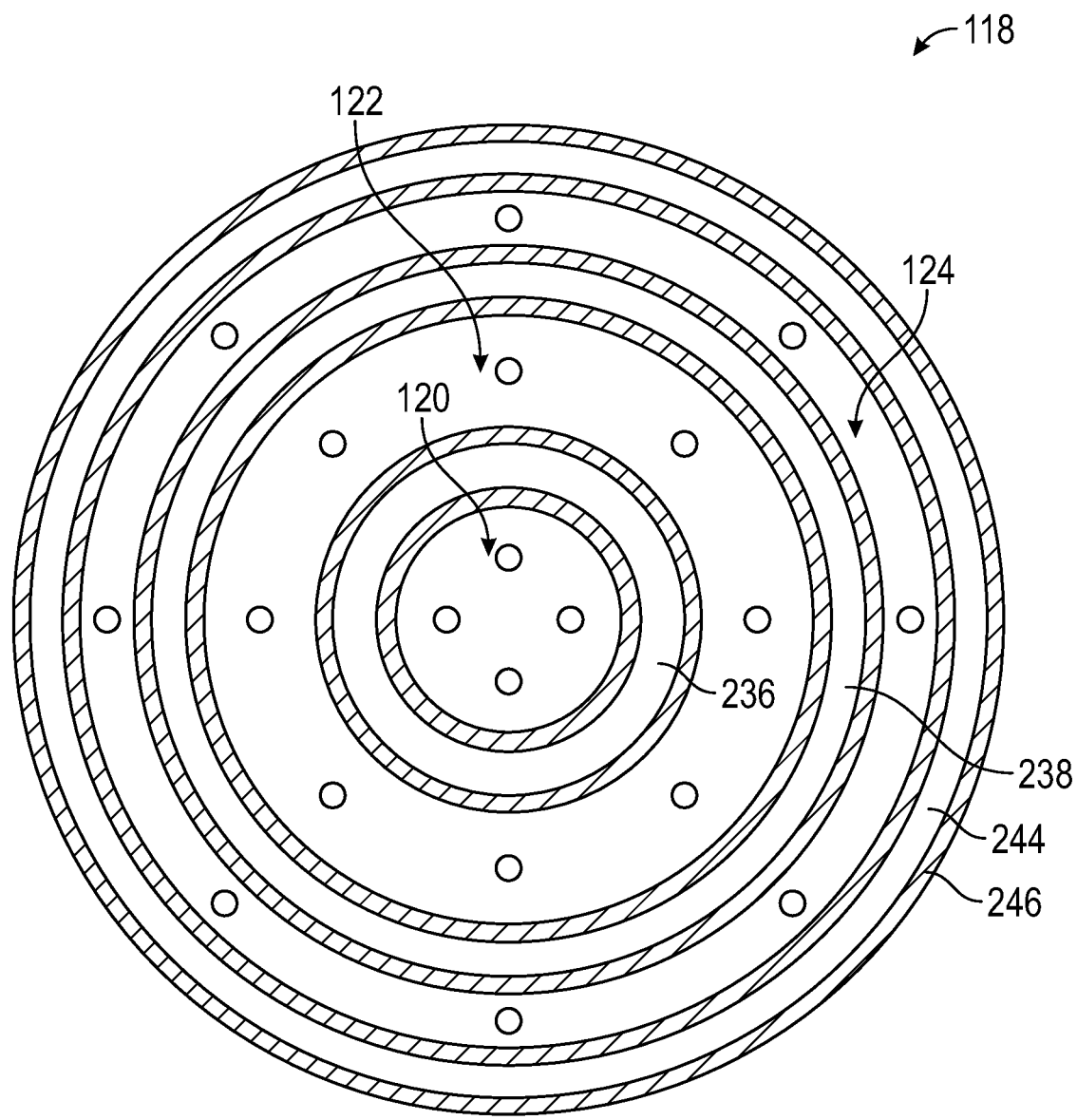
FIG. 13 is a partial cross-sectional view of a cooling airflow dispersing member taken at plane 13-13 of FIG. 12, according to an aspect of the present disclosure.

FIG. 12 is a schematic partial cross-sectional view of a portion of the outer liner 54, taken at detail view 100 in FIG. 2, according to yet another aspect of the present disclosure. In the FIG. 12 aspect, the cooling airflow dispersing member 118 is formed as a continuous-shaped structural element 119 that is shaped to define the main cavity portion 120, the first peripheral cavity portion 122, and the second peripheral cavity portion 124. That is, the continuous-shaped structural element 119 may be formed from, for example, a single sheet of sheet metal or foil that is stamped, bent, formed, hammered or otherwise processed so as to form the various cavities of the cooling airflow dispersing member 118 as the continuous shaped structural element 119. Referring to FIG. 13, which is a partial cross-sectional view taken at plane 13-13 of FIG. 12, the cooling airflow dispersing member 118 is shown as generally being formed to define each of the main cavity portion 120, the first peripheral cavity portion 122, and the second peripheral cavity portion 124 as circular cavities that are concentric to one another. Of course, other shapes for the continuous-shaped structural element 119 may be implemented instead, including any of the shapes shown in, for example, FIGS. 5 to 8. In FIGS. 12 and 13, a first transition portion 236 is formed between the main cavity portion 120 and the first peripheral cavity portion 122, and a second transition portion 238 is formed between the first peripheral cavity portion 122 and the second peripheral cavity portion 124. In the FIG. 12 aspect, the at least one peripheral cavity outlet flow passage 134 may comprise a first transition portion gap 240 provided between the first transition portion 236 and the first side 110 of the hot side liner segment 104. The first transition portion gap 240 provides for the third flow 226 of the cooling air 82(c) to flow from the main cavity portion 120 to the first peripheral cavity portion 122 in a similar manner as was described above with regard to FIG. 11. Similarly, a second transition portion gap 242 may be provided between the second transition portion 238 and the first side 110 of the hot side liner segment 104 to provide the fifth flow 230 of the cooling air 82(c) from the first peripheral cavity portion 122 to the second peripheral cavity portion 124. A hot side flange 244 may be connected to the hot side liner segment 104 via, for example, being brazed. A first end 250 of a connecting wall 246 is attached to the hot side flange 244 and a cold side flange 248 is attached to a second end of the connecting wall 246. The cold side flange 252 may be connected to the cold side liner segment 102 via, for example, being brazed.

In the FIG. 12 aspect, the first peripheral cavity portion 122 may also include a plurality of first peripheral cavity inlet openings 254 for providing additional cooling air 82(c) from the baffle cavity 106 directly into the first peripheral cavity portion 122. The second peripheral cavity portion 124 may also include a plurality of second peripheral cavity inlet openings 256 for providing additional cooling air 82(c) from the baffle cavity 106 directly into the second peripheral cavity portion 124. In addition, an air cavity 258 of the baffle cavity 106 between the cold side liner segment 102 and the shaped continuous shaped structural element 119 may be filled with a metal foam or a lattice filament element 260 between the first side 108 of the cold side liner segment 102 and a cold side 262 of the continuous shaped structural element 119.

While the foregoing description relates generally to a gas turbine engine, it can readily be understood that the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A combustor liner for a gas turbine, the combustor liner includes a cold side liner segment including a plurality of cold side cooling airflow openings therethrough, a hot side liner segment arranged inward of the cold side liner segment and including a plurality of hot side cooling airflow openings therethrough, a baffle cavity defined between a first side of the cold side liner segment and a first side of the hot side liner segment, and at least one cooling airflow dispersing member arranged within the baffle cavity, the at least one cooling airflow dispersing member including a main cavity portion, and at least one peripheral cavity portion surrounding the main cavity portion, the main cavity portion including (i) a main cavity inlet side having at least one of the plurality of cold side cooling airflow openings, (ii) a main cavity outlet side for providing an impingement cooling to a portion of the hot side liner segment, and (iii) at least one peripheral cavity outlet flow passage providing fluid communication between the main cavity portion and the at least one peripheral cavity portion, and the at least one peripheral cavity portion including a peripheral cavity outlet side having least one of the plurality of hot side cooling airflow openings.

The combustor liner according to the preceding clause, wherein the at least one cooling airflow dispersing member comprises a plurality of cooling airflow dispersing members, each respective cooling airflow dispersing member being arranged at a high temperature region of the combustor liner.

The combustor liner according to any preceding clause, wherein at least one of the main cavity portion and the at least one peripheral cavity portion includes a plurality of turbulators arranged on the first side of the hot side liner segment.

The combustor liner according to any preceding clause, wherein the main cavity portion includes a main cavity baffle plate arranged within the main cavity portion between the first side of the cold side liner segment and the first side of the hot side liner segment, the main cavity baffle plate including a plurality of baffle plate openings therethrough.

The combustor liner according to any preceding clause, wherein a first main cavity portion is defined between the first side of the cold side liner segment and the main cavity baffle plate, and a second main cavity portion is defined between the main cavity baffle plate and the first side of the hot side liner segment, and the at least one peripheral cavity outlet flow passage being arranged in the second main cavity portion.

The combustor liner according to any preceding clause, wherein the main cavity portion extends between the first side of the cold side liner segment and the first side of the hot side liner segment, and the at least one peripheral cavity portion extends partially from between the first side of the cold side liner segment and the first side of the hot side liner segment to the first side of the hot side liner segment.

The combustor liner according to any preceding clause, wherein the at least one cooling airflow dispersing member comprises a continuous-shaped structural element that is shaped to define the main cavity portion, and the at least one peripheral cavity portion, and including a transition portion between the main cavity portion and the at least one peripheral cavity portion.

The combustor liner according to any preceding clause, wherein the at least one peripheral cavity outlet flow passage is provided between the transition portion and the hot side liner segment.

The combustor liner according to any preceding clause, wherein the continuous-shaped structural element is a formed metal sheet, and the formed metal sheet is connected to the cold side liner segment along a cold side flange of the continuous shaped structural element, and is connected to the hot side liner segment along a hot side flange of the continuous-shaped structural element.

The combustor liner according to any preceding clause, wherein a filament element is provided between the first side of the cold side liner segment and a cold side of the continuous-shaped structural element.

The combustor liner according to any preceding clause, wherein the main cavity portion is defined by a main cavity wall extending from the first side of the cold side liner segment to the first side of the hot side liner segment, and each peripheral cavity portion of the at least one peripheral cavity portion is defined by a respective peripheral cavity wall having a respective peripheral wall perimeter surrounding a main cavity wall perimeter of the main cavity wall.

The combustor liner according to any preceding clause, wherein the at least one peripheral cavity portion comprises a first peripheral cavity portion having a first peripheral cavity wall defining a first peripheral cavity wall perimeter surrounding the main cavity wall perimeter of the main cavity wall with a first gap therebetween, and a second peripheral cavity portion having a second peripheral cavity wall defining a second peripheral cavity wall perimeter surrounding the first peripheral cavity wall perimeter with a second gap therebetween.

The combustor liner according to any preceding clause, wherein the first peripheral cavity wall includes a plurality of first peripheral cavity wall outlet openings therethrough providing fluid communication between the first peripheral cavity portion and the second peripheral cavity portion.

The combustor liner according to any preceding clause, wherein the first peripheral cavity portion includes a first peripheral cavity outlet side having at least one of the plurality of hot side cooling airflow openings, and the second peripheral cavity portion includes a second peripheral cavity outlet side having at least one of the plurality of hot side cooling airflow openings.

The combustor liner according to any preceding clause, wherein the first peripheral cavity wall defines a first peripheral cavity wall perimeter and includes a first end connected with the first side of the hot side liner segment and a second end extending into the baffle cavity a first distance from the first end, and the second peripheral cavity wall defines a second peripheral cavity wall perimeter and includes a third end connected with the first side of the hot side liner segment and a fourth end extending into the baffle cavity a second distance less than the first distance from the third end.

The combustor liner according to any preceding clause, wherein the main cavity wall perimeter, the first peripheral cavity wall perimeter and the second peripheral cavity wall perimeter, at the first side of the hot side liner segment, are symmetrical with each other.

The combustor liner according to any preceding clause, wherein the main cavity wall perimeter, the first peripheral cavity wall perimeter, and the second peripheral cavity wall perimeter, at the first side of the hot side liner segment, are asymmetrical with each other.

The combustor liner according to any preceding clause, wherein the first peripheral cavity portion includes a first peripheral cavity enclosure wall extending from the main cavity wall to the second end of the first peripheral cavity wall and extending about the main cavity wall perimeter and about the first peripheral cavity wall perimeter, and the second peripheral cavity portion includes a second peripheral cavity enclosure wall extending from the first peripheral cavity wall to the fourth end of the second peripheral cavity wall and extending about the first peripheral cavity wall perimeter and about the second peripheral cavity wall perimeter.

The combustor liner according to any preceding clause, wherein the cold side liner segment is adjacent to an outer flow passage of a combustor, and the hot side liner segment is adjacent to a combustion chamber of the combustor.

The combustor liner according to any preceding clause, wherein the at least one cold side cooling airflow openings of the main cavity inlet side are arranged to provide a first flow of cooling air into the main cavity portion to impinge against the main cavity outlet side of the hot side liner segment, the main cavity portion including at least one of the plurality of the hot side cooling airflow openings through the main cavity outlet side configured to provide a second flow of cooling air from the main cavity portion to a hot surface side of the hot side liner segment, the at least one peripheral cavity outlet flow passage is configured to provide a third flow of cooling air from the main cavity portion into the first peripheral cavity portion, the at least one of the plurality of hot side cooling airflow openings of the first peripheral cavity outlet side are configured to provide a fourth flow of cooling air from the first peripheral cavity portion to the hot surface side of the hot side liner segment, the plurality of first peripheral cavity wall outlet openings are configured to provide a fifth flow of cooling air from the first peripheral cavity portion into the second peripheral cavity portion, and the at least one of the hot side cooling airflow openings of the second peripheral cavity outlet side are configured to provide a sixth flow of cooling air from the second peripheral cavity portion to the hot surface side of the hot side liner segment.

Although the foregoing description is directed to some exemplary embodiments of the present disclosure, other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor liner for a gas turbine comprising:
a cold side liner segment including a plurality of cold side cooling airflow openings therethrough;
a hot side liner segment arranged inward of the cold side liner segment and including a plurality of hot side cooling airflow openings therethrough;
a baffle cavity defined between a first side of the cold side liner segment and a first side of the hot side liner segment; and
at least one cooling airflow dispersing member arranged within the baffle cavity, the at least one cooling airflow dispersing member including a main cavity portion, and a plurality of peripheral cavity portions surrounding the main cavity portion, the main cavity portion including (i) a main cavity wall defining a main cavity wall perimeter, (ii) a main cavity inlet side having at least one of the plurality of cold side cooling airflow openings, (iii) a main cavity outlet side for providing an impingement cooling to a portion of the hot side liner segment, and (iv) at least one peripheral cavity outlet flow passage providing fluid communication between the main cavity portion and at least one of the plurality of peripheral cavity portions, and the plurality of peripheral cavity portions including a first peripheral cavity portion having a first peripheral cavity wall defining a first peripheral cavity wall perimeter surrounding the main cavity wall perimeter of the main cavity wall with a first gap therebetween, and a second peripheral cavity portion having a second peripheral cavity wall defining a second peripheral cavity wall perimeter surrounding the first peripheral cavity wall perimeter with a second gap therebetween, the first peripheral cavity portion and the second peripheral cavity portion including a peripheral cavity outlet side having at least one of the plurality of hot side cooling airflow openings therethrough.

2. The combustor liner according to claim 1, wherein the at least one cooling airflow dispersing member comprises a plurality of cooling airflow dispersing members, each respective cooling airflow dispersing member being arranged at a high temperature region of the combustor liner.

3. The combustor liner according to claim 1, wherein at least one of the main cavity portion, the first peripheral cavity portion, and the second peripheral cavity portion includes a plurality of turbulators arranged on the first side of the hot side liner segment.

4. The combustor liner according to claim 1, wherein the main cavity portion includes a main cavity baffle plate arranged within the main cavity portion between the first side of the cold side liner segment and the first side of the hot side liner segment, the main cavity baffle plate including a plurality of baffle plate openings therethrough.

5. The combustor liner according to claim 4, wherein a first main cavity portion is defined between the first side of the cold side liner segment and the main cavity baffle plate, and a second main cavity portion is defined between the main cavity baffle plate and the first side of the hot side liner segment, and the at least one peripheral cavity outlet flow passage being arranged in the second main cavity portion.

6. The combustor liner according to claim 1, wherein the main cavity portion extends between the first side of the cold side liner segment and the first side of the hot side liner segment, and the first peripheral cavity portion and the second peripheral cavity portion extend partially from between the first side of the cold side liner segment and the first side of the hot side liner segment to the first side of the hot side liner segment.

7. The combustor liner according to claim 6, wherein the at least one cooling airflow dispersing member comprises a continuous-shaped structural element that is shaped to define the main cavity portion, the first peripheral cavity portion, and the second peripheral cavity portion, and includes a first transition portion between the main cavity portion and the first peripheral cavity portion, and a second transition portion between the first peripheral cavity portion and the second peripheral cavity portion.

8. The combustor liner according to claim 7, wherein the at least one peripheral cavity outlet flow passage is provided between the first transition portion and the hot side liner segment.

9. The combustor liner according to claim 7, wherein the continuous-shaped structural element is a formed metal sheet, and the formed metal sheet is connected to the cold side liner segment along a cold side flange of the continuous-shaped structural element, and is connected to the hot side liner segment along a hot side flange of the continuous-shaped structural element.

10. The combustor liner according to claim 9, wherein a filament element is provided between the first side of the cold side liner segment and a cold side of the continuous-shaped structural element.

11. The combustor liner according to claim 1, wherein the main cavity wall extends from the first side of the cold side liner segment to the first side of the hot side liner segment, and the at least one peripheral cavity outlet flow passage is arranged through the main cavity wall.

12. The combustor liner according to claim 1, wherein the first peripheral cavity wall includes a plurality of first peripheral cavity wall outlet openings therethrough providing fluid communication between the first peripheral cavity portion and the second peripheral cavity portion.

13. The combustor liner according to claim 12, wherein the first peripheral cavity portion includes a first peripheral cavity outlet side having at least one of the plurality of hot side cooling airflow openings, and the second peripheral cavity portion includes a second peripheral cavity outlet side having at least one of the plurality of hot side cooling airflow openings.

14. The combustor liner according to claim 13, wherein the first peripheral cavity wall includes a first end connected with the first side of the hot side liner segment and a second end extending into the baffle cavity a first distance from the first end, and the second peripheral cavity wall includes a third end connected with the first side of the hot side liner segment and a fourth end extending into the baffle cavity a second distance less than the first distance from the third end.

15. The combustor liner according to claim 14, wherein the main cavity wall perimeter, the first peripheral cavity wall perimeter, and the second peripheral cavity wall perimeter, at the first side of the hot side liner segment, are symmetrical with each other.

16. The combustor liner according to claim 14, wherein the main cavity wall perimeter, the first peripheral cavity wall perimeter, and the second peripheral cavity wall perimeter, at the first side of the hot side liner segment, are asymmetrical with each other.

17. The combustor liner according to claim 14, wherein the first peripheral cavity portion includes a first peripheral cavity enclosure wall extending from the main cavity wall to the second end of the first peripheral cavity wall and extending about the main cavity wall perimeter and about the first peripheral cavity wall perimeter, and the second peripheral cavity portion includes a second peripheral cavity enclosure wall extending from the first peripheral cavity wall to the fourth end of the second peripheral cavity wall and extending about the first peripheral cavity wall perimeter and about the second peripheral cavity wall perimeter.

18. The combustor liner according to claim 17, wherein the cold side liner segment is adjacent to an outer flow passage of a combustor, and the hot side liner segment is adjacent to a combustion chamber of the combustor.

19. The combustor liner according to claim 18, wherein the at least one of the plurality of cold side cooling airflow openings of the main cavity inlet side are arranged to provide a first flow of cooling air into the main cavity portion to impinge against a main cavity outlet side of the hot side liner segment, the main cavity portion including at least one of the plurality of the hot side cooling airflow openings through the main cavity outlet side configured to provide a second flow of cooling air from the main cavity portion to a hot surface side of the hot side liner segment, the at least one peripheral cavity outlet flow passage is configured to provide a third flow of cooling air from the main cavity portion into the first peripheral cavity portion, the at least one of the plurality of hot side cooling airflow openings of the first peripheral cavity outlet side are configured to provide a fourth flow of cooling air from the first peripheral cavity portion to the hot surface side of the hot side liner segment, the plurality of first peripheral cavity wall outlet openings are configured to provide a fifth flow of cooling air from the first peripheral cavity portion into the second peripheral cavity portion, and the at least one of the hot side cooling airflow openings of the second peripheral cavity outlet side are configured to provide a sixth flow of cooling air from the second peripheral cavity portion to the hot surface side of the hot side liner segment.

* * * * *